Sept. 8, 1970  R. W. KRUGGEL  3,527,061
ABSORPTION REFRIGERATION SYSTEM WITH REFRIGERANT
CONCENTRATION CONTROL
Filed Aug. 26, 1968  3 Sheets-Sheet 1

INVENTOR
ROY W. KRUGGEL

BY Hofgren, Wegner, Allen, Stellman & McCord
ATTORNEYS

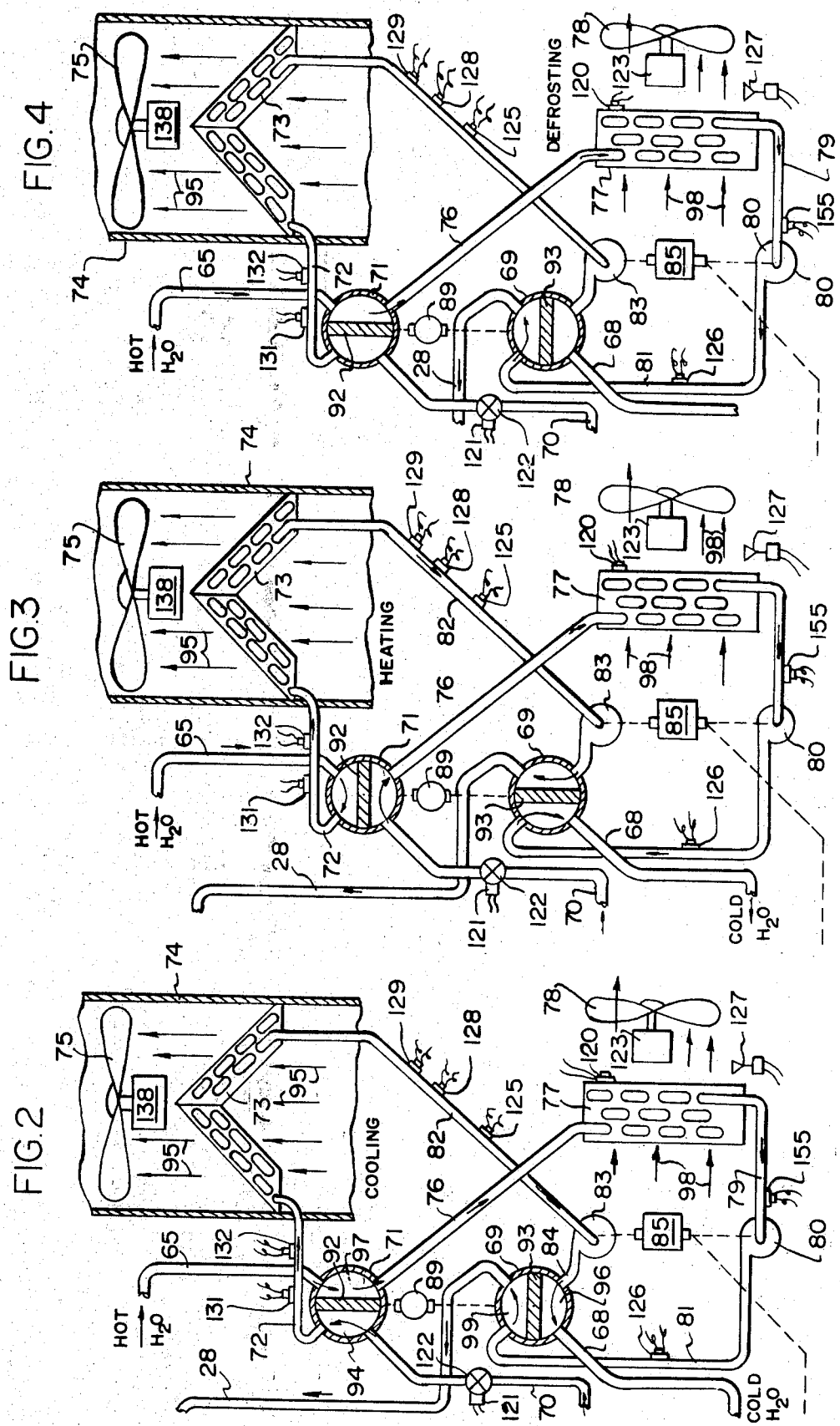

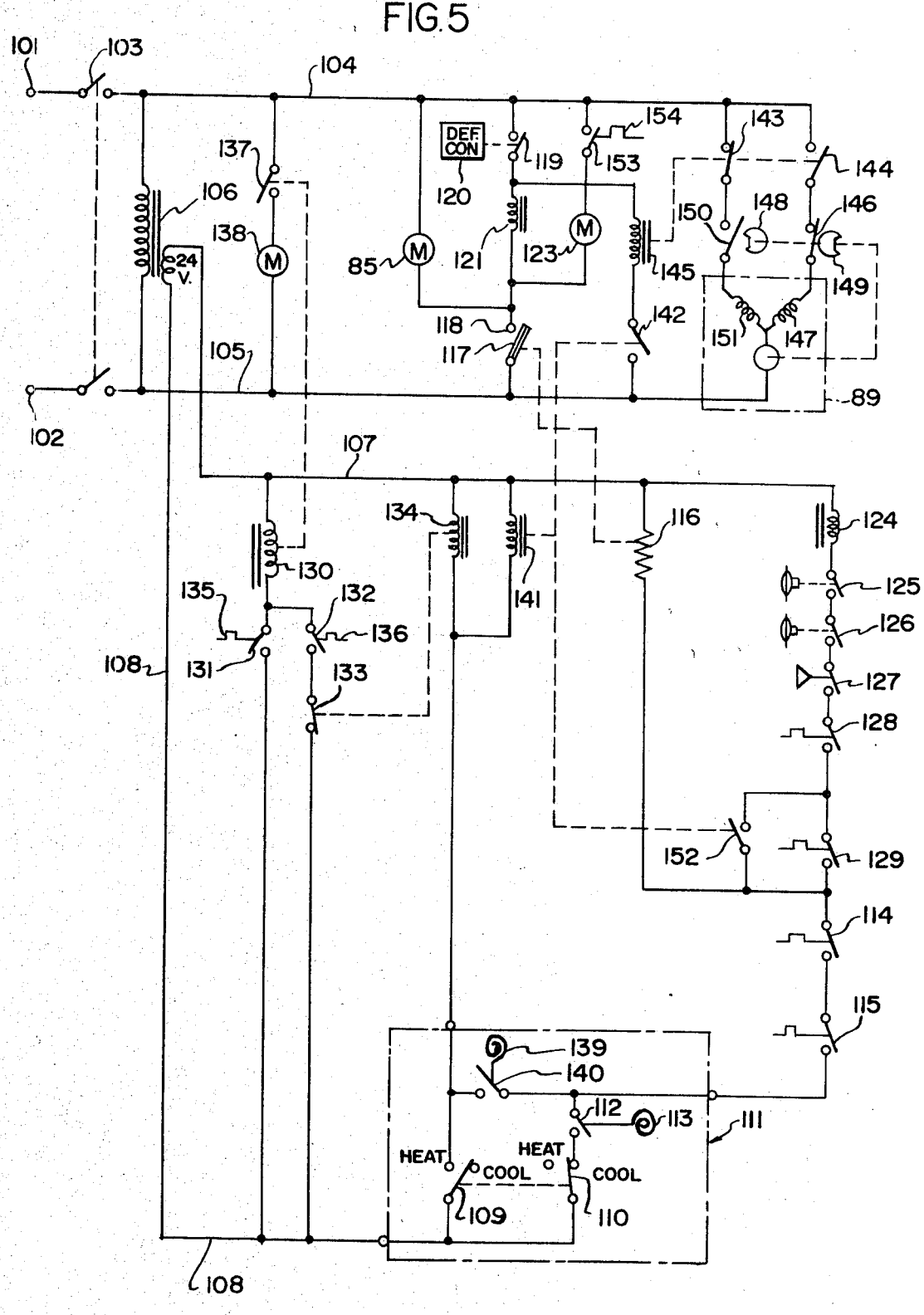

United States Patent Office 3,527,061
Patented Sept. 8, 1970

3,527,061
ABSORPTION REFRIGERATION SYSTEM WITH REFRIGERANT CONCENTRATION CONTROL
Roy W. Kruggel, St. Joseph, Mich., assignor to Whirlpool Corporation, a corporation of Delaware
Filed Aug. 26, 1968, Ser. No. 755,287
Int. Cl. F25b 29/00
U.S. Cl. 62—142                 9 Claims

ABSTRACT OF THE DISCLOSURE

An improved fluid concentration control for a heat pump using an absorption refrigeration system wherein the quantity of refrigerant supplied to the evaporator is automatically varied in accordance to the cooling load to which the evaporator is subjected. For example, should the cooling load decrease as during winter or heating operation, flow of refrigerant to the evaporator is cut back and the refrigerant is automatically stored out of the working fluid circuitry. This storage varies the concentration of refrigerant in the refrigerant-absorption liquid solution such that pressure within the evaporator is adjusted for optimum heat pump performance regardless of the ambient in which the heat pump operates. As refrigerant is removed or added to the system, the total volume of the refrigerant-absorption solution in the system, of course, varies accordingly. Thus, an enlarged liquid storage volume is provided within the generator so that even widely varying amounts of solution in the system will have only minor effect on changes in the liquid level within said generator.

BACKGROUND OF THE INVENTION

The invention pertains to a heat pump with automatic controls for heating and cooling in which an absorption refrigeration system is used having means for supplying refrigerant to the system for solution in the absorption liquid only as needed. Thus with heavy cooling requirements, as during summer or cooling operation, considerable liquid refrigerant will be supplied to the system. However, when little cooling is required, as when the pump is used for heating in the winter, the refrigerant will be withheld from the system.

This varying the amount of refrigerant supplied to the system in accordance with refrigerant requirements would normally cause a difference in liquid level within the generator because the amount of absorption liquid within the system always remains the same. Large variations of this liquid level in the generator would reduce the efficiency of the system. This invention provides an enlarged chamber at the liquid level in the generator so that even large changes in refrigerant-absorption liquid solution volume in the system results in only minor changes in the liquid level within the generator.

U.S. Pat. 2,272,871 also shows a gas heat pump using an absorption refrigeration system. However, here the refrigerant, which is ammonia, is not stored in a receiver when not required for cooling but rather is by-passed around the evaporator by a thermostatically controlled expansion valve with this by-passed refrigerant being supplied directly to an absorber 40. The structure of this patent therefore varies only the amount of refrigerant supplied to the evaporator, not the concentration of refrigerant in the system to coincide with the refrigeration requirements as is done in the present invention.

Pat. 3,138,938 employs a movable piston within a cylinder that is movable by pressure developed within the absorption system to vary the refrigerant concentration in the system. This device is much more complex and therefore less reliable than the invention here.

Pat. 3,368,367 shows an absorption refrigeration system having a leveling chamber in conjunction with a generator but this prior art patent provides no automatic refrigerant concentration control as is true in the present invention.

SUMMARY OF THE INVENTION

One of the features of this invention is to provide an improved absorption refrigeration system in which the liquid refrigerant is supplied to the evaporator in proportion to the cooling needs and in which the varying refrigerant-absorption liquid solution in the system will produce only slight variations in the liquid level within the generator of the system.

Other features and advantages of the invention will be apparent from the following description of one embodiment thereof as shown in the accompanying drawings. Of the drawings:

FIG. 2 is a view of the heat transferring fluid circuitry, as shown on the right-hand side of FIG. 1, illustrating the valve positions and the flow paths for the various fluids while the fluid circuitry is being used for cooling.

FIG. 3 is similar to FIG. 2 but illustrating the conditions during heating.

FIG. 4 is a view similar to FIGS. 2 and 3 but illustrating the conditions during defrosting of an exterior heat exchanger.

FIG. 5 is a schematic wiring diagram of the electrical control circuitry for the heat pump of FIG. 1.

ABSORPTION REFRIGERATION SYSTEM

Figure 1:
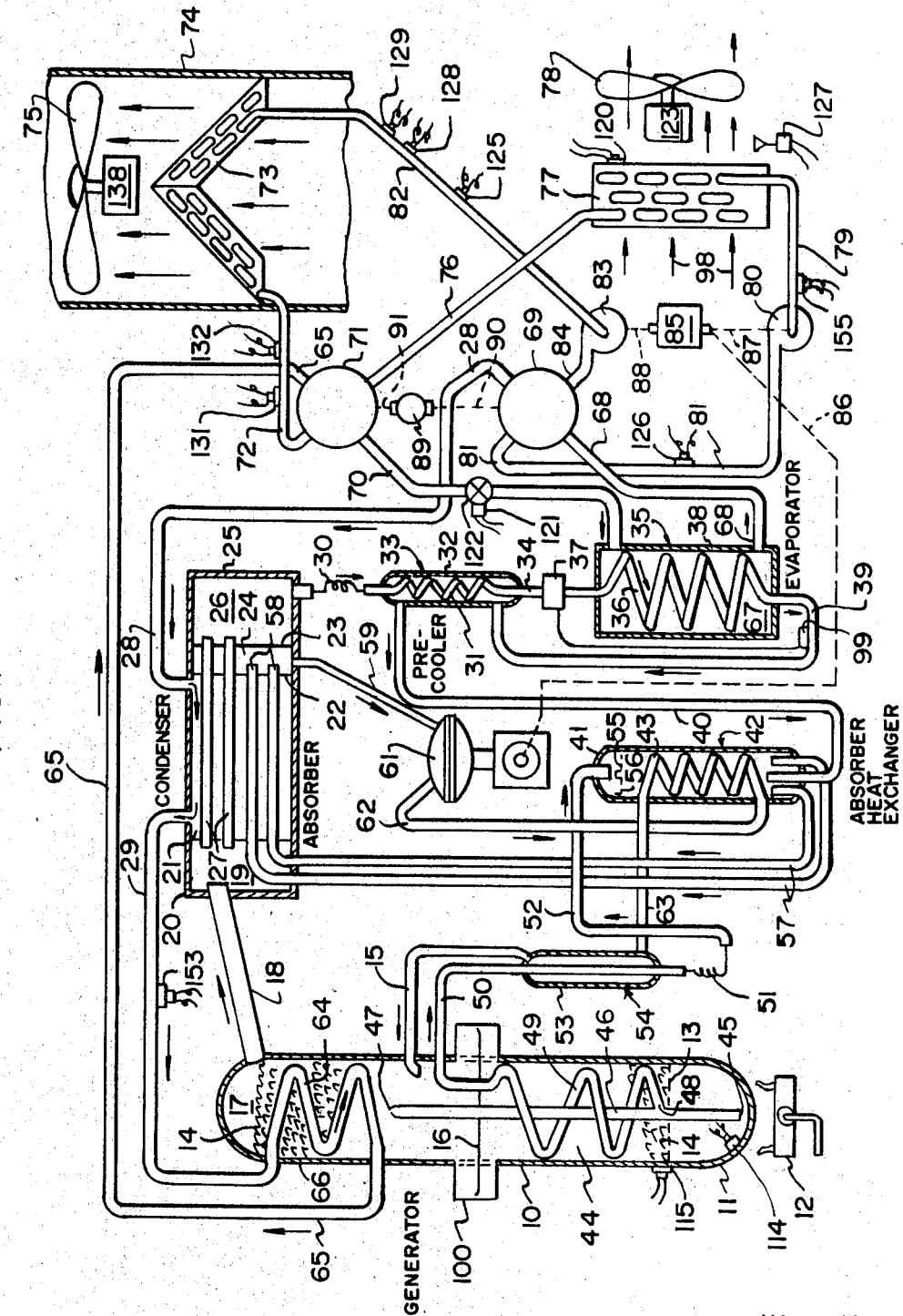
FIG. 1 is a semi-schematic view illustrating one embodiment of a heat pump capable of either heating or cooling a space using an absorption refrigeration system in combination with the heat transferring fluid circuitry of the instant invention.

As shown in FIG. 1, the heat transferring fluid circuitry of the instant invention is used in combination with an absorption refrigeration system. The fluid utilized by the heat transferring circuitry will typically be water with an appropriate amount of antifreeze added to allow year around operation. The working fluid in the absorption refrigeration system is a solution of a refrigerant in an absorption liquid. One well known example of such an absorption liquid is water and the refrigerant is typically ammonia.

Turning now to a description of the absorption refrigeration system of FIG. 1 there is provided a generator 10 in the form of a vertical cylinder having rounded top and bottom ends with the bottom end 11 heated in the customary manner as by a circular gas burner 12. Spaced upwardly from the bottom 11 of the generator 10 is a screen 13 on which is supported loose packing material 14 which may be Raschig rings. The generator is supplied with rich liquid, which is the customary identification for absorption liquid containing a high proportion of dissolved refrigerant, through a pipe 15. The generator 10 is kept only partially full of liquid as indicated by the liquid level 16.

The burner 12 boils dissolved refrigerant from the liquid in the generator and this refrigerant, which is in the form of a hot refrigerant gas, bubbles up through the packing 14 and the liquid at the bottom of the generator to a top space 17 in the generator 10.

From space 17 the hot refrigerant gas is conducted by a pipe 18 into a header space 19 at one end of an elongated horizontal container 20.

One side of this header space 19 is defined by a partition 21 and there is also provided a second partition 22 spaced therefrom and a third partition 23 closely spaced from the partition 22. The two partitions 22 and 23 cooperate to define a space 24 while the partition 23 and the other end 25 of the container 20 define a second header space 26.

Extending through the partitions 21, 22 and 23 with their ends in the header spaces 19 and 26 are a plurality of pipes 27 which function as a condenser when cooling liquid such as water is directed into the space between the partitions 21 and 22 by a pipe 28 and from this space by a pipe 29.

With the above arrangement heated gaseous refrigerant flowing from the header 19 through the pipes 27 into the header space 26 is condensed to liquid refrigerant.

The liquid refrigerant space 26, which operates as a storage means or storage chamber for liquid refrigerant, is connected to a flow restrictor 30 in the form of a capillary tube. This capillary in turn is connected to the internal coil 31 surrounded by a cylinder 32 to provide a precooler 33 for ammonia refrigerant.

From the bottom of the precooler 33 the pipe 34 of the coil 31 extends to an evaporator 35. This evaporator is in the form of an internal helical coil 36 connected to the pipe 34 through a thermostatically regulated expansion valve 37. The evaporator coil 36 is surrounded by a liquid, such as water, contained within a jacket 38.

The end of the coil 36 opposite the expansion valve 37 is connected to an exit conduit or pipe 39 for conveying cold gaseous refrigerant from the evaporator coil 36. This cold gaseous refrigerant is directed by the pipe 39 into one end of the cylinder 32 of the precooler 33 where it serves to precool the liquid refrigerant passing through the helical coil 31 within the cylinder 32.

From the other end of the precooler 33 the gaseous refrigerant is conducted by a pipe 40 into the bottom end of the vertical cylinder 41 of an absorber-heat exchanger 42. This abbsorber heat exchanger contains within it a helical coil 43.

Because heat is provided at its greatest intensity at the bottom end 11 of the generator 10 the liquid solution 44 within the generator is weakest adjacent this bottom end. In other words, the liquid here contains the lowest amount of dissolved refrigerant in the generator. This weak liquid flows into the bottom end 45 of a vertical pipe 46 within the generator having a small opening 47 in its upper end for pressure equalizing purposes. The pipe 46 operates as a standpipe and weak liquid passes upwardly therethrough to the lower end 48 of a heat transfer helical coil 49 that is vertically arranged about the standpipe 46 within the generator 10 and surrounded by the packing material 14. This helical coil 49 is connected to an exit pipe 50 that extends through the side wall of the generator 10. Pipe 50, which therefore conveys weak liquid from the generator, next passes through a cylinder 53 which forms a heat exchanger 54.

After passing through this heat exchanger pipe 50 is connected to a flow restrictor capillary 51 whose other end is connected to a pipe 52. Pipe 52 extends into the top of the vertical cylinder 41 of the absorber heat exchanger 42. Beneath the inner end of the pipe 52 within this cylinder is a liquid distribution plate 55 having small openings 56 therein and arranged horizontally. This plate 55 is located above the helical coil 43 within the cylinder 41 so that weak liquid drips down over the coil 43 to be contacted by refrigerant gas flowing upwardly from the previously described pipe 40. As the weak liquid trickles down through the absorber heat exchanger 42 it, of course, becomes richer in dissolved refrigerant. The resulting enriched liquid and gaseous refrigerant that has not yet been absorbed flow from the bottom of the vertical cylinder 41 through a pair of pipes 57 having open ends at a lower level than the end of pipe 40. These pipes 57 pass through the bottom of the header space 19 and extend horizontally as indicated at 58 into the header space 24. Thus these horizontal pipes 58 are also surrounded by cooling liquid from the supply pipe 28 and function as water cooled absorber tubes. The result is that the absorber heat exchanger 42 in series with the water cooled absorber pipes 58 supply rich liquid to the header space 24.

Rich liquid from the space 24 flows through pipe 59 to a positive displacement, diaphragm pump 61. This diaphragm pump 61 serves to force the rich liquid through a pipe 62 into the heat exchange coil 43 within the absorber heat exchanger 42. In passing through the coil 43 the rich liquid is heated by heat generated as a result of the exothermic absorption process taking place on the surface of coil 43 as hot, weak liquid absorbs cold ammonia vapor. Coil 43 is connected by a pipe 63 to the lower end of the cylinder 53 of the heat exchanger 54. The rich liquid in passing up through the cylinder 54 becomes heated further by heat exchange contact with the interior pipe 50 within the cylinder 53 prior to passing through the previously described pipe 15 into the generator 10 above the liquid level 16 therein.

As stated earlier, water to the water cooled condenser-absorber container 20 is supplied by the pipe 28 for cooling both the condenser pipes 27 and the absorber pipes 58. This water is then conducted from the container 20 by the pipe 29 which directs the water through the helical coil 64 in the top of the generator 10 above the liquid level 16 and adjacent the gaseous refrigerant exit pipe 18. From the coil 64 the water which has become heated both by heat absorbed within the condenser-absorber 20 and by the vapors at the top of the generator 10 is directed from the coil 64 through a pipe 65. The cooling coil 64 within the generator 10 functions as a reflux condenser and condenses entrained water vapor from the gaseous refrigerant so that the condensed water falls into the liquid in the generator.

The described absorption refrigeration system operates as follows: Heat applied by the burner 12 expels dissolved refrigerant from the solution within the generator 10 by boiling. This gaseous refrigerant rises up through the packing 14 and is cooled at the top of the generator by the reflux condenser coil 64. Water condensed from the gas then falls back into the liquid. The resulting dried refrigerant gas then passes out of the top of the generator through the pipe 18 into the condenser header 19. From here the gaseous refrigerant flows through the pipes 27 wherein it is condensed to liquid refrigerant and collects in the header space 26 which serves as a liquid refrigerant storage means or chamber. From here the liquid refrigerant under high pressure is forced through the capillary 30, precooler 33 and valve 37 into the coil 36 within the evaporator 35. The refrigerant evaporates in the coil 36 to produce a cooling effect on the surrounding ambient environment contained within the space 67 as defined by the jacket 38. In the illustrated embodiment this environment is a heat transfer liquid such as water which is used for cooling a space such as a house, as will be described in detail hereinafter.

From the bottom of the evaporator 35 the refrigerant which is gas or mixed gas and liquid flows through the exit pipe 39 to and through the precooler 33 and from here into the bottom of the absorber heat exchanger 42 at which point it is primarily refrigerant gas.

This gas rising in the cylinder 41 is absorbed into weak absorption liquid flowing down through the cylinder 41 from the distribution plate opening 56. The weak liquid flowing into cylinder 41 from pipe 52 is forced from the bottom of generator 10 by pressure developed therein by way of the bottom standpipe opening 45, opening 48, coil 49 within the generator, exit pipe 50 from the generator, heat exchanger 54, capillary 51 and pipe 52.

In flowing down through the vertical cylinder 41 the liquid is made richer by absorbing refrigerant gas supplied by the pipe 40 and the mixture of resulting liquid and gas is directed by the pipes 57 to the water cooled absorber pipes 58 within the condenser-absorber 20. This liquid, which is now rich liquid, flows from the absorber pipes 58 into the rich liquid space 24 and from there by way of the pipe 59, diaphragm pump 61, pipe 62, coil 43 within the absorber heat exchanger 42, pipe 63, heat exchanger cylinder 53 and pipe 15 back into the generator above the liquid level 16 therein.

HEAT TRANSFERRING FLUID CIRCUITRY FOR THE HEAT PUMP

As stated earlier, the heat pump of the instant invention comprehends the use of novel heat transferring fluid circuitry, in conjunction with the above described absorption refrigeration system to either heat or cool a space. This heat transferring fluid circuitry provides means for routing liquid in heat transfer relationship with the heat producing components of the absorption refrigeration system; i.e. the absorber-condenser package and the reflux condenser. The fluid circuitry further provides for routing liquid in heat transfer relationship with the heat absorbing components of the absorption refrigeration system; i.e. the evaporator. Should it be desired to heat a space, valving associated with the heat transferring fluid circuitry automatically routes liquid heated by the absorber-condenser package and reflux condenser to a space heat exchange coil and passes fluid cooled by the evaporator to a radiator coil located in the environment external to the heated space. Should cooling be desired, the valving is set up to pass liquid cooled by the evaporator to the space heat exchanger coil and to route liquid heated by the absorber-condenser package and reflux condenser to the radiator. The heat transferring fluid circuitry further automatically routes heated liquid to the radiator coil should defrosting thereof be required during winter operation. It should be noted that circuit means. The cold water circuit means includes a pipe 68 leading from a four-way valve 69 to the bottom of the heat transferring fluid circuitry to be described below functions independently of the absorption refrigeration system described previously. Thus, this circuitry could also be used with a mechanical refrigeration system.

Referring now to FIG. 1, it is noted that the heat transferring fluid circuitry includes both cold and hot water the water jacket 38 of the evaporator 35 and a pipe 70 leading from the top of this jacket to a second four-way valve 71. A pipe 72 leads from the valve 71 to an A-coil heat exchanger 73 in an air duct 74 through which air is forced by a motor operated fan 75 for supplying the air to a space to be heated or cooled such as the interior of a house (not shown).

From the four-way valve 71 a pipe 76 leads to an air cooled radiator 77 that is usually located to be contacted by outdoor air drawn therethrough by a second fan 78. From the radiator 77 a pipe 79 leads to a pump 80 whose outlet is connected to a pipe 81 leading to valve 69. The pipe 28 of the heated liquid circuit leads from the valve 69.

The side of the heat exchanger 73 opposite valve 71 is connected by a pipe 82 to a second pump 83 whose outlet is connected by a pipe 84 to the valve 69. Diaphragm pump 61 and water circulating pumps 80 and 83 are operated by a motor 85 as indicated by the dotted lines 86, 87 and 88. The positions of the valves 69 and 71 are controlled by servo motor 89 that is operatively connected to the valves as indicated by the dotted lines 90 and 91.

The operation of this heat exchanging fluid circuit for cooling is illustrated in FIG. 2, for heating is illustrated in FIG. 3 and for defrosting the radiator 77 is illustrated in FIG. 4.

Each four-way valve 71 and 69 has a flat core 92 and 93, respectively, each dividing its valve body into two substantially semi-cylindrical sections. When the valve core 92 is turned to the position shown in FIG. 2 the semi-cylindrical chamber 94 on one side of valve 71 connects cold water pipe 70 from the evaporator 35 to the inlet pipe 72 to the A-coil heat exchanger 73 that is within the passage 74. This cools the exchanger 73 so that air indicated by the arrows 95 drawn through the coil by the fan 75 is chilled before passage to the house or other environment to be cooled.

At the some time the core 93 of valve 69 is turned to the position shown in FIG. 2 and here the pipe 84 from the pump 83 which draws relatively warm liquid from the A-coil heat exchanger 73 is connected to the evaporator inlet pipe 68 by way of valve chamber 96 in valve 69.

At the same time pipe 65 of the hot water circuit means directs heated liquid through chamber 97 in valve 71 to the pipe 76 which leads to the radiator 77 where this liquid is cooled by air indicated by the arrows 98. The liquid from the radiator 77 which has thusly been cooled is then forced by the pump 80 through the pipe 81 and valve chamber 99 into the return pipe 28 of the heated water circuit. Thus with the valve cores set in the positions shown in FIG. 2 water chilled by evaporator 35 is directed by way of valve chamber 94 into the A-coil heat exchanger 73 and back into the evaporator by way of pipe 82, valve chamber 96 and pipe 68. At the same time heated water is directed by these valves through the radiator 77 where it is cooled by air 98 drawn by the fan 78.

When heating of the house is desired the valve cores 92 and 93 are turned to the positions shown in FIG. 3. In these positions the chilled water from the evaporator 35 is directed through the radiator 77 to pick up heat because even in the winter this liquid coming directly from the evaporator will be at a lower temperature than outside air 98. The heated liquid from the pipe 65, which as explained is a part of the heated liquid circuit, is directed by the valve 71 in FIG. 3 through the A-coil heat exchanger 73 in the duct 74 in order to warm the air passing through the duct. The return water from the A-coil heat exchanger 73 passes through the pipe 82 and valve 69 back into the return pipe 28 for reheating.

Because the temperatures to which the radiator 77 is subjected are quite low in winter it is necessary that this radiator be periodically defrosted in order that it may operate properly. The positions of the valves during this defrosting are shown in FIG. 4. Under these conditions the heated water from the pipe 65 is directed by the valve 71 through the pipe 76 into and through the radiator 77. This water which is heated by passing through the circuit of which pipe 65 is a part serves to to melt frost from the coils of the radiator 77.

The water passes from radiator 77 by way of the pipe 79 and is forced in its circuit by the pump 80. From the pump 80 the water passes through the pipe 81 and valve 69 back into the return line 28 of the heated water circuit.

While defrosting is taking place the cold water circuit including the evaporator 35 and A-coil heat exchanger 73 is inactivated as will be described in detail hereinafter so that this liquid circuit remains dormant during the defrosting.

As can be seen, the heat pump of this invention has two separate heat exchange liquid circuits, one (cold) circuit including the evaporator 35 and the other (hot) including the condenser-absorber 20 and the reflux condenser coil 64. The liquid in each of these circuits may be water and, where necessary, contain a suitable amount of anti-freeze composition to prevent freezing when subjected to subfreezing conditions as by passage through the radiator 77 during the winter season in cold climates.

THE AUTOMATIC CONTROL OF REFRIGERANT CONCENTRATION

Because the heat pump of this invention is used for heating, cooling and defrosting, when necessary, the refrigeration system is required to operate over a wide range of ambient conditions. For example, for cooling operation during the summer, water supplied to the evaporator 35 from the A-coil heat exchanger 73 is at a high temperature. This high temperature insures that large amounts of refrigerant will be evaporated in the evaporator to properly cool the liquid going to A-coil heat exchanger 73. Furthermore, due to the high evaporator temperature, this evaporation takes place at relatively high pressures. On the other hand, during operation in winter when the heat pump is used for heating, water passed through the evaporator 35 is next passed through radiator 77 where the ambient atmosphere is at a low temperature. This means that the liquid passed back through the evaporator by way of the pipe 68 as shown in FIG. 3 is also at a very low temperature. Because the temperature is low a considerably smaller amount of refrigerant is needed in the evaporator coil 36 during these winter operating conditions. Also, in order for evaporation to take place at all in the evaporator at such low ambient temperatures, the pressure within the evaporator must be much lower than during summer operation.

To be more specific, with an evaporator temperature of 45° F. during summer operation using ammonia as the refrigerant, the ammonia flow will often be around 80 pounds per hour and, for proper evaporation of refrigerant, the low side system pressure (pressure in the evaporator and absorber) should ideally be about 65 pounds per square inch gauge. On the other hand, the refrigerant flow will ordinarily be about 20 pounds per hour in winter and for proper evaporation, the low side pressure should be about 1 pound per square inch gauge. By reducing the flow of refrigerant through the evaporator during winter conditions, the concentration of refrigerant in the absorption liquid solution in the system can be lowered. This reduced concentration of the rich liquid results in a lower evaporator pressure for winter operations which is necessary for proper evaporation of the refrigerant therein. For example, at the summer 45° F. evaporator temperature, the rich liquid concentration flowing to the generator ideally should be about 45% by weight ammonia, while at the winter −25° F. evaporator temperature the rich liquid should be only about 18% by weight ammonia.

This means that in order to provide optimum operation of the heat pump for both winter and summer operation, it is highly desirable to remove unneeded refrigerant from the system during those periods in which little refrigerant is required as during winter operation. The apparatus to achieve this automatic removal of refrigerant will now be described as shown in the illustrated embodiment.

Referring back to FIG. 1 as noted previously, a header space storage chamber 26 is provided in the condenser-absorber container 20 to receive condensed liquid refrigerant from the condenser tubes 27. This liquid refrigerant flows into the evaporator coil 36 through an expansion valve 37 which is automatically controlled by a thermostatic sensing bulb 99 located in the exit pipe 39 adjacent the point where it leaves the evaporator 35. Thus the opening in the expansion valve 37 is controlled by the temperature of the refrigerant leaving the evaporator. This means that the colder this leaving refrigerant the less liquid refrigerant is passed through the valve 37 whereas the hotter the exiting refrigerant the larger the opening in the valve 37. This means that only the proper amount of liquid refrigerant is admitted to the evaporator coil 36 to provide the desired amount of refrigeration in the evaporator 35. During winter operation when the refrigerant requirements are much less, as explained above, the liquid refrigerant is "backed-up" and accumulates in the storage chamber 26.

Storage of liquid refrigerant in the chamber 26, of course, keeps refrigerant out of the system as a whole. This tends to affect the liquid level 16 within the generator 10. Severe variations in this liquid level in the generator has the undesirable effect of changing the efficiency of operation of the generator. Therefore, it is desirable that this liquid level be maintained within relatively small variations. In the illustrated embodiment this is achieved by providing an enlarged section or chamber 100 of the generator 10 across which extends the top surface defining the liquid level 16 of the liquid within the generator. As can be seen in FIG. 1, the cross sectional area of this chamber 100 which is annular around the cylindrical generator 10 is considerably greater than the cross sectional area of the adjacent portions of the generator itself. This means that the amount of retained refrigerant in the storage chamber 26 may vary considerably while affecting only slightly the liquid level 16 within the generator.

The retaining of unneeded liquid refrigerant in the storage chamber 26 by operation of the thermostat control valve 37 also has the affect of changing the concentration of refrigerant in the absorption liquid (e.g. ammonia dissolved in water). This is true because although the amount of refrigerant itself changes as described the amount of absorption liquid within the system remains constant. Thus, the working fluid in the absorption system is automatically compensated for optimum performance regardless of the ambient condition.

THE ELECTRICAL CONTROL CIRCUITRY OF THE HEAT PUMP

The control circuit and the various controls for the absorption refrigeration heat pump disclosed in FIGS. 1–4 is shown schematically in the wiring diagram of FIG. 5. As shown here 117 volt AC is delivered through terminals 101 and 102. The power flow is controlled by a double-pole, single-throw on-off switch 103 by means of which power is made available between the lines 104 and 105. Between these lines there is connected a step-down transformer 106 which provides 24 volt AC power between lines 107 and 108 which in turn supplies the low voltage portion of the heat pump control circuit.

Cooling

The heat pump of FIG. 1 is activated for cooling by manually moving gang-connected switches 109 and 110 of thermostat 111 to their cooling positions as shown at the bottom of FIG. 5. Assuming that cooling is required, the switch 112 of the thermostat 111 is also closed by its control element 113 which, as shown, is a part of the house thermostat 111.

Because the generator burner 12 is not yet lighted, a generator high temperature safety thermostat 114 located at the bottom of the generator 10 and a back flame safety thermostat 115 also on the generator 10 are closed. The safety thermostat 115 is used to shut down operation of the absorption system should the fluid within the generator 10 become excessively hot through malfunction or any other reason. Safety thermostat 114 is intended to shut down operation of the system should the fan 78 which cools both the radiator 77 and creates a draft for the gas burner 12 fail to operate. Under these conditions both thermostats 114 and 115 would be open.

However, with proper operating conditions both thermostats 114 and 115 are closed. Then a thermal time delay heater 116 heats a bimetallic switch 117 sufficiently to close against its contact 118. This immediately energizes motor 85 which, as previously described, drives water circulating pumps 80 and 83 as well as diaphragm pump 61. The motor 85 thereupon causes water to be pumped through the hot and cold water circuitry and the rich liquid to be pumped by the diaphragm pump 61 into the generator 10 in the manner previously described.

When the cycle of operation of the system is started, defrost control switch 119, operated by a defrost control unit 120, is also closed. This switch supplies power from line 104 to relay coil 121 which in turn opens valves 122 (FIG. 1). This valve, which is in line 70 from the evaporator 35, controls flow through the cold water pipe from the evaporator 35. This permits the evaporator cooled water to flow into and through the A-coil heat exchanger 73 in the duct 74. The closed switch 119 also supplies power to the motor 123 of fan 78. The fan 78 thereupon begins drawing air 98 through the radiator 77 as shown in FIG. 2. Under these conditions water is flowing through both circuits as previously described, the pumps are operating and the cooling fan 78 for the radiator 77 is operating.

Simultaneously the following switches in the circuit between the low voltage power supply lines 107 and 108 are closed: These switches, which are in series with a gas valve solenoid 124 which admits gas to the burner 12, are the cold and hot water circuitry pressure switches 125 and 126 which are closed due to pressure established by liquid flow in the hot and cold water circuitry lines. Movement of air through the radiator 77 closes a fan sail switch 127. Because the initial temperature of water flowing through both the hot and cold water circuitry lines is cold, a hot liquid return line regulating thermostat 128 and a cold liquid return line regulating thermostat 129 are also initially closed. Since thermostat switch 112 and the manually set switches 109 and 110 are already closed, a circuit is established between lines 107 and 108 to gas valve solenoid 124. This starts the burner 12 operating which heats the generator 10 and starts the operation of the absorption system.

After the system is operating properly water flowing through the A-coil heat exchanger 73 in the air flow duct 74 will be chilled to about 45° F., for example. When this occurs a relay coil 130 is energized through a cold water fan delay thermostat switch 132. The switch 132 is in series with a normally closed relay switch 133 which is controlled by a relay coil 134. Since coil 134 is de-energized during this cooling operation by open switch 109, switch 133 will be closed as shown in FIG. 5.

Thermostats 135 and 136 which operate the switches 131 and 132, respectively, are located in the water line 72 conducting water to the heat exchanger 73. Because during cooling only chilled liquid is flowing through line 72 the hot liquid thermostat switch 131 does not close; only the cold liquid control thermostat switch 132. Thermostat switch 131 will not close until liquid flowing to the A-coil heat exchanger 73 exceeds approximately 120° F. On the other hand, the cold liquid thermostat 132 will close when the liquid flowing to the A-coil heat exchanger 73 drops below about 45° F. These temperatures are, of course, given by way of example only.

Thus as soon as the chilled liquid from the evaporator 35 passes to the A-coil heat exchanger 73, thermostat switch 132 closes and energizes solenoid relay coil 130. This closes a normally open switch 137 so that the motor 138 for the air circulating fan 75 is energized. Under these conditions the air is drawn over the A-coil heat exchanger 73 in the duct 74 and is forced into the space such as the interior of the house to be cooled. The system continues to operate in this manner until cooling thermostat 113 functions at the preset temperature on the house thermostat 111 to open, thereby interrupting the power supply to the gas valve solenoid 124. This shuts off the gas burner 12 and the absorption refrigeration system begins to shut down. As the opening of switch 112 also de-energizes the heater 116 the bimetallic switch 117 also opens after a short period of time. This shuts off both the water circulating pumps 80 and 83 by de-energizing the motor 85 and also stops the operation of the motor 123 that drives the cooling fan 65. Then, as soon as water passing into the A-coil heat exchanger 73 through supply line 72 rises above 45° F. thermostat 132 in this line opens to de-energize relay coil 130 and break the power to the fan motor 138.

In order to prevent excessive chilling during cooling periods, the temperature of water flowing through the A-coil heat exchanger 73 is also regulated by a thermostat 129 in the exit line 82 from the A-coil heat exchanger 73. This thermostat 129 opens whenever liquid passing from the A-coil heat exchanger 73 drops below a preselected temperature, for example 35° F. This opening of thermostat 129 interrupts power to the gas valves 124. Because the heater 116 is still energized the fan motor 123 and operating motor 85 for the pumps 80, 83 and 61 will continue to be energized and thus to operate. Because gas valve solenoid 124 is de-energized, however, the absorption system itself will not operate. This means that the liquid passing into the A-coil heat exchanger 73 will slowly rise in temperature and thermostat 129 will again close to re-energize the gas valve solenoid 124 and restart the burner 12.

As can be seen there are a number of safety devices that form a part of this system. As stated earlier should the generator 10 rise to too high a temperature, the safety thermostat 114 will open to shut down the entire system. Also, if the fan motor 123 should fail so that air is no longer drawn through the radiator 77, the sail switch 127 would open and this would interrupt the power supply to the gas valve solenoid 124 and thereby close the valve. A further safety factor related to fan motor 123 is provided as failure of this motor would cause the fan 78 to stop and there would be no longer be a draft provided to the gas burner 12. When this occurred the safety thermostat 115 would become overly heated and open, thereby interrupting power to the entire unit.

Heating

When the heat pump illustrated is required for heating, as during winter operation, switches 109 and 110 are manually moved to the left to engage their heat contacts. These are, of course, the switches that are a part of the house thermostat unit 111. When this is done heat control thermostat element 139 controls its switch 140 to control operation of the system under the heating conditions. In addition, relay coils 134 and 141 are energized from line 107 by the closing of manual switch 109. The energizing of relay coil 141 in this manner closes normally open relay switch 142 to open normally closed relay switch 143 and close normally open switch 144 by energizing relay coil 145.

The closing of relay switch 144 in this manner establishes power from line 104 through a cam actuated switch 146. This circuit includes a field winding 147 of the servo motor 89. When thusly energized, motor 89 rotates valve cores 92 and 93 from the "cooling" positions shown in FIG. 2 to the "heating" positions shown in FIG. 3. As the valve cores move in this manner a pair of cams 148 and 149 (FIG. 5) are also rotated. With the valve cores in the above stated position of FIG. 3 these cams close switch 150 and open switch 146. As switch 143 in series with switch 150 is open, as described above, power cannot be supplied to the windings 151 of motor 89. At the same time opening of the cam controlled switch 146 de-energizes the other windings 147 of motor 89. Thus valve cores 92 and 93 are held motionless in their FIG. 3 positions.

The energizing of relay coil 141 also closes a normally open relay switch 152 to provide a circuit around the cold liquid return line regulating thermostat 129. In effect, therefore, switch 129 is shorted out by the closing of switch 152 which is necessary during the heating operation since whenever liquid passing from the A-coil heat exchanger 73 in the duct 74 rises above 45° F. the power supply would be interrupted by the opening of switch 129 if it were not shorted out. This is, of course, undesirable when the water temperature in A-coil heat exchanger 73 is to be maintained at about 130° F.

Movement of the manual control switch 109 to the heat position as previously described also energizes relay coil 134 to open switch 133 which is shown in closed position in FIG. 5. This causes the energization of relay coil 130 to be controlled by the hot water fan delay thermostat switch 131 which is opened and closed by its thermostat element 135. This means that as soon as liquid passing from the A-coil heat exchanger 73 exceeds the 125° F. preselected setting thermostat switch 131 will be closed. Relay coil 130 will then be energized from electric supply lines 107 and 108 to close switch 137 which will energize fan motor 138 from the main power lines 104 and 105.

As to the other components of the circuit of FIG. 5 they will perform in the same manner as previously described for cooling. The result is that under the heating conditions, the hot water return line regulating thermostat 128 governs water temperature in A-coil heat exchanger 73 and will open each time the water leaving the A-coil heat exchanger 73 in duct 74 exceeds a predetermined temperature to indicate that no more heating of the water is required temporarily. This opening of the switch 128 under the thermostatic control terminates power to the gas valve solenoid coil 124 and the liquid flowing through the heating portion of the system will thereby cool. Thus control of the entire system during the described heating operation is controlled by the switch 140 of the house thermostat 111. This switch 140 controls the operation by controlling the power supply to both the heater 116 and the gas valve solenoid coil 124 when the heating requirements are satisfied and will not resume operation until more heat is required.

Defrosting

As described earlier during the heating operation the radiator 77, which is normally subjected to outside air that can, of course, be quite cold, sometimes becomes at least partially clogged with frost build-up. That is true also because the liquid flowing through the radiator 77 during heating is quite cold as it comes from the evaporator 35 by way of the control valve 71. Because of this the control as illustrated particularly in the circuit of FIG. 5 provides for automatically defrosting the radiator 77.

The main defrost control includes a pressure sensitive switch 120 mounted so as to be responsive to suction pressure created by the fan 78 which draws air through the radiator 77 as indicated by the arrows 98. When the radiator 77 begins to build up frost air flow through the radiator 77 is decreased and this decrease is in proportion to the amount of frost build-up. As the frost increases the pressure sensed by the switch 120 changes and switch 119 is opened by the control 120 at a predetermined pressure. Assuming that the water leaving the condenser-absorber container or jacket 20 is above a preselected temperature which, for example, may be 120° F. the by-pass switch 153 controlled by its thermostat 154 will be open as shown in FIG. 5. This switch 153 is used to insure that the hot liquid in the hot liquid circuit that also includes the reflux coil 64 at the top of the generator 10 contains enough heated liquid to completely defrost the radiator 77. Under these conditions the by-pass switch 153 as stated will be open and defrost control switch 119 controls the defrosting of the radiator 77.

Thus the opening of the switch 119 opens the power supply to the relay coil 121, fan motor 123 and the relay coil 145. This de-energization of coil 145 closes switch switch 143 and opens switch 144 as shown in FIG. 5. At this time cam operated switch 150 is closed while the other cam operated switch 146 is opened, or just the opposite to that shown in FIG. 5. This means that power is supplied to field winding 151 in the motor 89 which is thereupon energized to begin rotating valve cores 92 and 93 toward the positions shown in FIG. 4 for defrosting. When the cores have reached the positions of FIG. 4 cam 148 opens switch 150 while cam 149 closes its switch 146 so that both of these switches are then in the positions shown in FIG. 5. This repositioning of the valve cores thereupon passes hot water from the line 65 through the valve 71 and through the line 76 into and through the radiator 77. This passage through the exchanger melts the frost thereon and the liquid is returned to its circuit by way of the exit pipe 79, pump 80, line 81 and valve 69 into the return line 28 of the hot water circuit. Because fan motor 123 is also de-energized at this time the hot water passing through the radiator 77 is not cooled by air flow so that the heat of the water can be used solely to remove frost.

The de-energizing of the relay coil 121 by the opening of the switch 119 causes valve 122 to close so that cold water cannot flow through the cold liquid water circuit from the evaporator 35. Therefore, during the defrosting operation there is no delivery of cold water to the A-coil heat exchanger 73 in spite of the fact the valve 71 is set to the proper position as valve 122 blocks the cold liquid flow. This means, therefore, that there is no supplying of chilled air to the house through the air duct 74.

When the liquid leaving radiator 77 through the exit line 79 rises above a predetermined temperature, which indicates that substantially all of the frost has been removed, this temperature is sensed by thermostat 155 (see FIG. 1). When this occurs, the defrost control switch 119 is again closed to re-establish power to the relay coil 121, fan motor 123 and relay coil 145. Thus relay coil 145 causes the motor 89 to turn the four-way valves 69 and 71 again to the heating position of FIG. 3 so that hot water is again delivered to the A-coil heat exchanger 73 in the air duct 74 to resume the heating operation.

The energization of coil 121 re-opens valve 122 in the cold water line 70 so that the cold water again flows from the evaporator through the radiator 77 in the manner previously described. At the same time the energization of cooling fan motor 123 is re-established to operate fan 78 to again resume the drawings of cooling air through the radiator 77. Thus the system is returned to normal heating operation automatically upon removal of the frost from the radiator 77.

While I have shown and described a preferred embodiment of my invention, it is to be understood that it is capable of many modifications. Changes, therefore, in the construction and arrangement be made without departing from the spirit and scope of the invention as defined in the appended claims.

The embodiments of the invention in which an exclusive property or privilege is claimed are defined as follows:

1. An absorption refrigeration system, comprising: a generator for expelling dissolved refrigerant as a gas from a refrigerant-absorption liquid solution; means for supplying said solution to said generator to a preselected general level; a condenser for condensing said gas to a liquid refrigerant; storage means for receiving said liquid refrigerant; an evaporator in which said liquid refrigerant evaporates to cool an ambient environment; an absorber in which evaporated refrigerant from said evaporator is absorbed into the absorption liquid; means for operatively connecting the generator, condenser, evaporator and absorber; means for flowing liquid refrigerant from said storage means to said evaporator; means for varying the pressure at which evaporation takes place in said evaporator including means for varying the amount of liquid refrigerant passed to said evaporator in relation to the varying temperature of said ambient environment thereby varying also the volume of refrigerant available for absorption into said absorption liquid in said absorber; and means for providing an enlarged liquid surface area at said preselected level whereby changes in said level height with changes in said solution volume will be minimized.

2. The system of claim 1 wherein there are provided an exit conduit from said evaporator and means for varying the amount of liquid flowing from the storage means directly with the varying temperature of the refrigerant flowing through said exit.

3. The system of claim 1 wherein said storage means comprises a storage chamber adjacent said condenser to receive liquid refrigerant therefrom and the means for flowing comprises a conduit extending from said chamber to an entrance to the evaporator.

4. The system of claim 3 wherein said conduit between the chamber and evaporator entrance includes a flow restrictor for maintaining an elevated pressure within the storage chamber.

5. The system of claim 1 wherein said means for providing an enlarged liquid surface area comprises an enlarged section of said generator at said liquid level across which the top surface of the liquid extends.

6. The system of claim 3 wherein said conduit is provided with an expansion valve with means for thermostatically controlling volume flow through the valve in proportion to the temperature of refrigerant leaving said evaporator to regulate flow of liquid refrigerant from the storage means.

7. The system of claim 6 wherein said means for thermostatically controlling comprises a temperature sensor at the refrigerant exit from the evaporator to control said volume flow to the evaporator by the temperature of refrigerant leaving the evaporator.

8. The system of claim 7 wherein means for providing an enlarged liquid surface area comprises an enlarged section of said generator at said liquid level across which the top surface of the liquid extends.

9. The system of claim 8 wherein said storage means comprises a storage chamber adjacent said condenser to receive liquid refrigerant therefrom and the means for flowing comprises a conduit extending from said chamber to an entrance to the evaporator, and said conduit between the chamber and evaporator entrance includes a flow restrictor for maintaining an elevated pressure within the storage chamber.

References Cited

UNITED STATES PATENTS

| | | | |
|---|---|---|---|
| 2,178,561 | 11/1939 | Coons | 62—141 X |
| 3,005,318 | 10/1961 | Miner | 62—141 |
| 3,122,002 | 2/1964 | Miner et al. | 62—141 |
| 3,138,938 | 6/1964 | Beardslee | 62—141 |
| 3,141,307 | 7/1964 | Beardslee | 62—141 |
| 3,369,373 | 2/1968 | Merrick | 62—141 |

WILLIAM E. WAYNER, Primary Examiner

U.S. Cl. X.R.

62—103, 185